P. C. PAULSEN.
AUTOMOBILE ROUTE AND MILEAGE INDICATOR.
APPLICATION FILED JAN. 2, 1915.
1,208,824.
Patented Dec. 19, 1916.
2 SHEETS—SHEET 1.
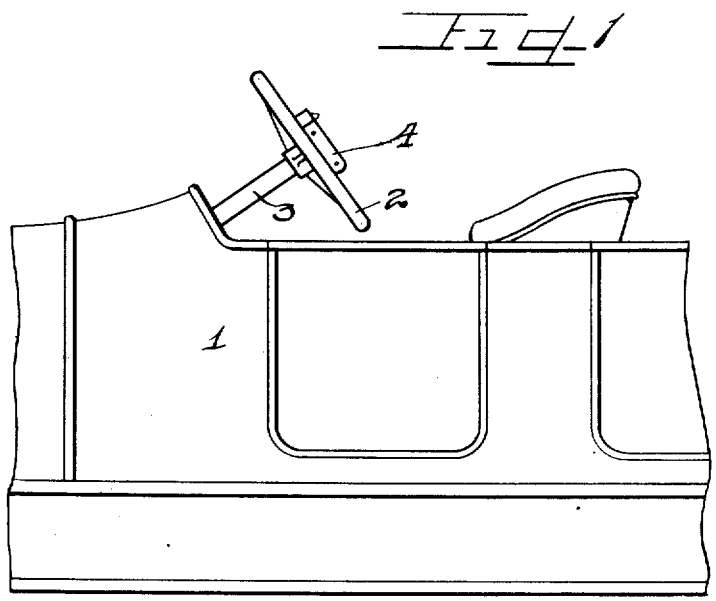
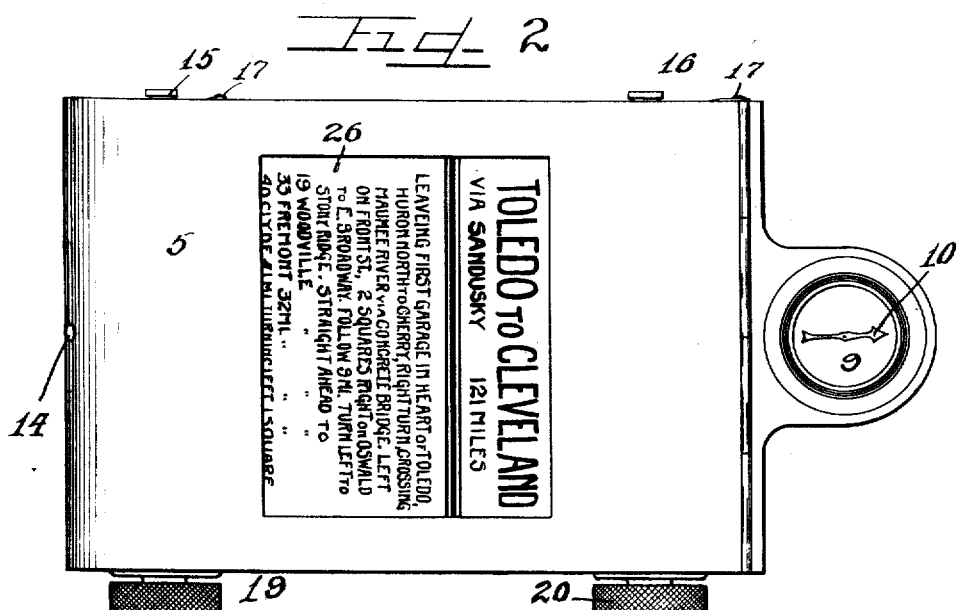

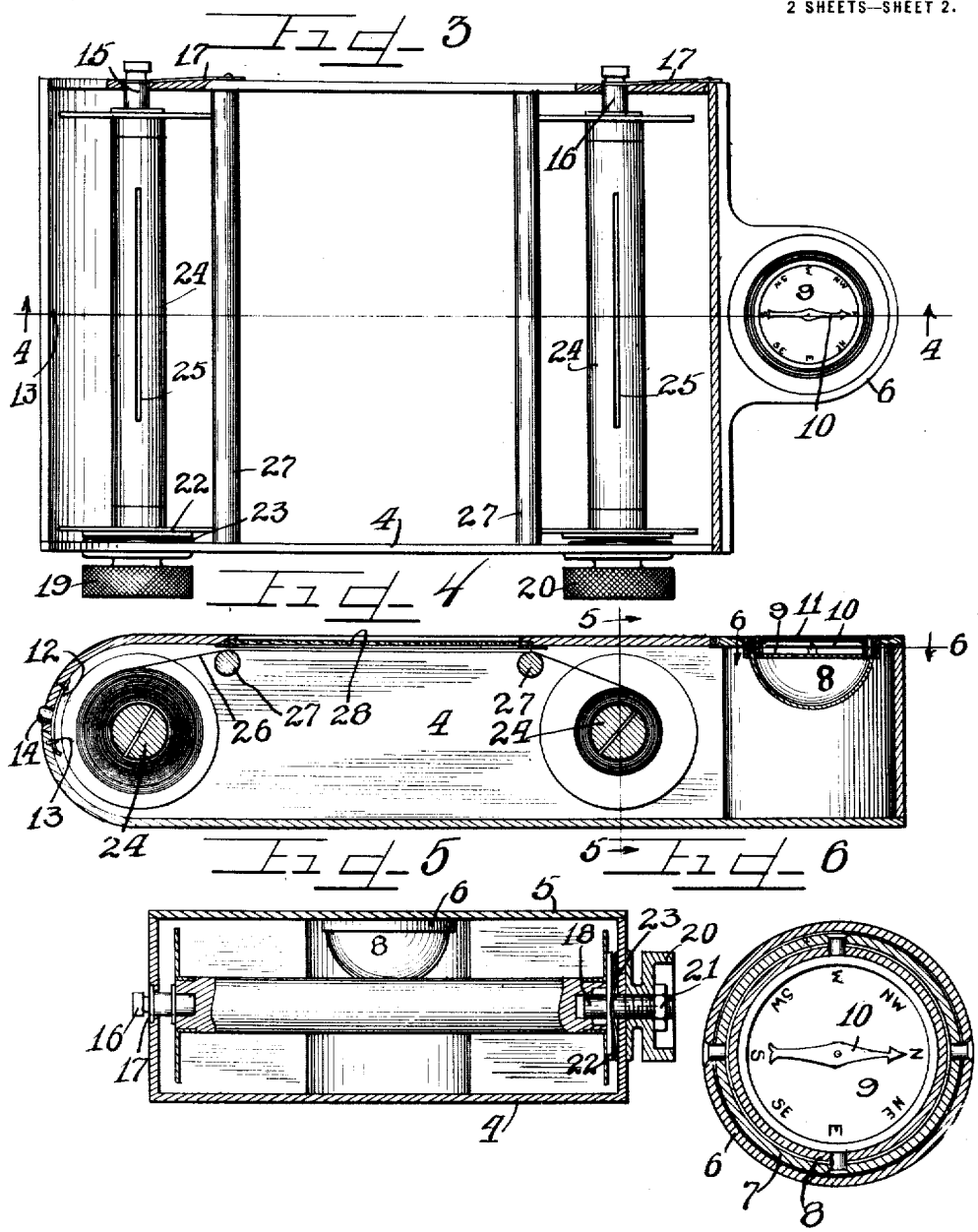

UNITED STATES PATENT OFFICE.

PAUL C. PAULSEN, OF CHICAGO, ILLINOIS, ASSIGNOR OF ONE-HALF TO HARRY U. MORTON, OF CHICAGO, ILLINOIS.

AUTOMOBILE ROUTE AND MILEAGE INDICATOR.

1,208,824.     Specification of Letters Patent.      Patented Dec. 19, 1916.

Application filed January 2, 1915. Serial No. 53.

*To all whom it may concern:*

Be it known that I, PAUL C. PAULSEN, a citizen of the United States, and a resident of the city of Chicago, in the county of Cook and State of Illinois, have invented certain new and useful Improvements in Automobile Route and Mileage Indicators; and I do hereby declare that the following is a full, clear, and exact description of the same, reference being had to the accompanying drawings, and to the numerals of reference marked thereon, which form a part of this specification.

This invention relates to automobile route indicators, and has for its object to provide, in connection with a direction strip, which is wound upon suitable spools mounted within a casing, a compass also mounted in said casing but bodily rotatable therein, so that the operator of the car readily may follow the directions when given in terms of the points of the compass.

The invention (in a preferred form) is illustrated in the drawings and hereinafter more fully described.

In the drawings: Figure 1 is a fragmentary side elevation of an automobile, illustrating a device embodying the principles of my invention attached upon the steering post above the wheel. Fig. 2 is a plan view of the device. Fig. 3 is an interior view thereof, with parts shown in section. Fig. 4 is a section taken on line 4—4 of Fig. 3. Fig. 5 is a section taken on line 5—5 of Fig. 4. Fig. 6 is a section taken on line 6—6 of Fig. 4.

As shown in the drawings: The reference numeral 1, indicates as a whole a motor car provided with a steering wheel 2, mounted upon a steering post 3. Mounted on the upper end of said steering post 3, within the steering wheel 2, is a route and mileage indicating device embodying the principles of my invention, and comprising a casing 4, with a hinged cover 5, connected thereon. An integral enlargement is formed on one end of the casing 4, and mounted in a circular aperture in the upper side thereof is an inwardly directed rotatable adjusting ring 6, pivoted in which is a gimbal ring 7, upon which is pivotally supported a weighted cup 8. A partition extends across the interior of said cup affording a dial 9, upon which letters representing the points of a compass are engraved or printed, and mounted upon a pivot at the center of said dial is a compass needle 10. The end of said cover 5, is provided with an apertured spring 12, which is adapted to engage over a pin 13, on the interior of the casing, to hold said cover normally closed, and a push button 14, is attached on said spring and extends through an aperture in the cover for manually releasing the spring from the exterior. Journaled in one of the side walls of the casing 4, are gudgeon pins 15 and 16, respectively, normally held projected inwardly into said casing by leaf springs 17. Journaled in the opposite side walls of the casing 4, in alinement with the respective gudgeon pins 15 and 16, are actuating key bolts 18, each provided with a knurled head, in the one instance denoted by the reference numeral 19, and in the other instance by the reference numeral 20. The knurled actuating heads are held upon said key bolts 18, by means of a nut 21, and mounted on each of said key bolts 18, within the casing, is a plate or disk 22, which, as clearly shown in Fig. 5, abuts against the key wings or extensions on the key bolt, and is impelled thereagainst by a spring element 23, engaged around the key bolt between said disk and the inner surface of the wall of the casing. The friction of said spring element 23, exerted between said disk 22, and the side wall of the casing, operates to resist movement of the knurled head and its key bolt.

A spool, denoted as a whole by the reference numeral 24, is adapted to be mounted in each end of the casing upon the respective alined gudgeon pins and key bolts, and as clearly shown in Fig. 3, each of said spools is slotted at 25 to receive the end of an indicating strip or tape 26, therethrough to retain the same, whereby the tape may be wound upon the spool. The tape is wound from one roll to the other; for instance, turning the knurled head 20 actuates one of the spools 24 to draw the tape from the other thereof, and small guide rolls 27 are provided extending transversely across within said casing 4, over which the tape is adapted to track, as clearly shown in Fig. 4. The hinged cover 5, is provided with a view aperture, sealed by a light of glass 28, and the rollers 27 are so positioned that that portion of the tape provided for inspection is held flat behind the glass in the view aperture of the cover.

The operation is as follows: When a certain trip to be made has been decided upon, the particular guide tape for that trip already upon its spool is inserted into the lower end of the casing by opening the cover 5, and depressing one end of the spool against the gudgeon pin 15, and latching the other end upon the key bolt which is actuatable by the knurled head 19. The end of the tape is then drawn up to the upper empty spool 24, within the casing, and the tab end of the tape is engaged through the slot 25, and the spool is then actuated by the knurled head 20, to move the first section of the guide tape up into a position beneath the view aperture in the cover, substantially the same operation taking place as when inserting a film into the well known roll film camera.

The view aperture is sufficient in size and the directions upon the tape are printed in such a manner that that portion of the tape on view before the operator of the car may cover the driving directions for a considerable portion of the road or territory, as for instance approximately forty or fifty miles. When the point has been reached by the automobile which coincides with the last driving direction given, the knurled head 20, is actuated to rotate the spool and wind the tape thereon, thus displaying another section of tape which may be used for the next portion of the trip. When any of the guiding directions are given in terms of the points of the compass, the driver may readily ascertain the position of the car by reference to the compass mounted at the upper or forward end of the device, the adjusting ring 6 being moved to register the north of the dial with the north pole of the needle, whereby that point of the compass toward which the car is pointing will be indicated by the compass dial.

The spring elements 23, bearing as they do against the disk or plates 22, which are movable with the key bolts, and also against the inner surface of the walls of the casing, act as friction brakes to resist movement of the respective spools, so that accidental adjustment thereof cannot take place due to jarring or vibration of the car.

I am aware that various details of construction may be varied through a wide range without departing from the principles of this invention, and I therefore do not purpose limiting the patent granted otherwise than necessitated by the prior art.

I claim as my invention:

1. In a directional device for vehicles, a casing, means in said casing for displaying the direction to be taken in terms of points of the compass, an adjusting ring rotatably mounted in said casing, and a compass pivotally supported by said ring, whereby when the ring is rotated to bring the north of the dial in register with the north pole of the compass needle that point of the compass toward which the vehicle is pointing will be indicated by the compass dial.

2. In a directional device for vehicles, a casing, an adjustable winding direction tape indicating mechanism in said casing, an adjusting ring rotatably mounted in said casing, and a compass pivotally supported in said ring, whereby when the ring is rotated to bring the north of the dial in register with the north pole of the compass needle that point of the compass toward which the vehicle is pointing will be indicated by the compass dial.

In testimony whereof I have hereunto subscribed my name in the presence of two subscribing witnesses.

PAUL C. PAULSEN.

Witnesses:
CHARLES W. HILLS, Jr.,
FRANK K. HUDSON.